United States Patent
Lakshmanan et al.

(10) Patent No.: US 8,463,811 B2
(45) Date of Patent: Jun. 11, 2013

(54) AUTOMATED CORRELATION DISCOVERY FOR SEMI-STRUCTURED PROCESSES

(75) Inventors: Geetika T. Lakshmanan, Cambridge, MA (US); Szabolcs Rozsnyai, Hawthorne, NY (US); Aleksander Slominski, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 13/083,832

(22) Filed: Apr. 11, 2011

(65) Prior Publication Data
US 2012/0259865 A1   Oct. 11, 2012

(51) Int. Cl.
*G06F 7/02* (2006.01)
*G06F 17/30* (2006.01)

(52) U.S. Cl.
USPC ............ 707/776; 707/803; 707/696; 707/748

(58) Field of Classification Search
USPC ................ 707/999.007, 999.1, 999.102, 688, 707/696, 748, 758, 776, 803
See application file for complete search history.

(56) References Cited

U.S. PATENT DOCUMENTS

2005/0114298 A1* 5/2005 Fan et al. ............................ 707/2
2007/0239518 A1* 10/2007 Chung et al. .................... 705/10
2011/0191373 A1* 8/2011 Botros et al. ................. 707/776

OTHER PUBLICATIONS

"Attribute Similarity and Event Sequence Similarity in Data Mining," Ronkainen, Pirjo, University of Helsinki, Department of Computer Science, Oct. 1998.*

* cited by examiner

*Primary Examiner* — Bruce Moser
(74) *Attorney, Agent, or Firm* — William Stock

(57) ABSTRACT

A computer-implemented method, system, and article of manufacture for determining a set of correlated data among heterogeneous computer applications. The method includes providing a computer system having software modules, receiving statistics on data relating to a first event and a second event, generating a confidence score for an attribute set, where the attribute set includes an attribute from the first event data and an attribute from the second event data, and selecting the attribute set as a set of correlated data if the confidence score is within a threshold value.

19 Claims, 9 Drawing Sheets

| OrderReceived | | | | | |
|---|---|---|---|---|---|
| DateTime | OrderId | Product | Amount | DeliveryUntil | CustomerId |
| 2011-01-01T09:35:52:50 | 166635 | ProductA | 10 | 2011-01-10T23:59:59:00 | 46546546 |
| 2011-01-01T09:40:54:50 | 166636 | ProductB | 2 | 2011-01-10T23:59:59:00 | 41231234 |
| 2011-01-01T09:41:51:30 | 166637 | ProductC | 1 | 2011-01-10T23:59:59:00 | 46123123 |
| 2011-01-01T09:43:32:50 | 166638 | ProductD | 7 | 2011-01-10T23:59:59:00 | 72123123 |
| 2011-01-01T09:43:42:50 | 166639 | ProductA | 2 | 2011-01-10T23:59:59:00 | 12312544 |

Fig. 5a

| Product | |
|---|---|
| Values | Cardinality |
| ProductA | 2 |
| ProductB | 1 |
| ProductC | 1 |
| ProductD | 1 |

Fig. 5b

| | OrderReceived | | | | | |
|---|---|---|---|---|---|---|
| | DateTime | OrderId | Product | Amount | DeliveryUntil | CustomerId |
| Index | <<Map>> | <<Map>> | <<Map>> | <<Map>> | <<Map>> | <<Map>> |
| Card | 5 | 5 | 4 | 4 | 1 | 5 |
| Cnt | 5 | 5 | 5 | 5 | 5 | 5 |
| AvgAttributeLength | 22 | 6 | 8 | 1.2 | 22 | 6 |
| InferencedType | DateTime | Numeric | Alphanumeric | Numeric | DateTime | Numeric |
| NoOfNumeric | 0 | 5 | 0 | 5 | 0 | 5 |
| NoOfAlphaNumeric | 0 | 0 | 5 | 0 | 0 | 0 |

Fig. 5c

AUTOMATED CORRELATION DISCOVERY FOR SEMI-STRUCTURED PROCESSES

CROSS-REFERENCE TO RELATED APPLICATIONS

The present application is related to a U.S. application entitled "EXTRACTING AND PROCESSING DATA FROM HETEROGENEOUS COMPUTER APPLICATIONS," Ser. No. 13/083,924, filed concurrently herewith, assigned to the same assignee, and the entire contents of which are incorporated by reference herein.

BACKGROUND OF THE INVENTION

The present invention relates generally to methods and systems for monitoring processes in computer systems. More particularly, the present invention relates to identifying a set of correlated event or process data among heterogeneous computer systems or applications.

Computer systems that support today's globally distributed, rapidly changing and agile businesses are steadily growing in size as well as complexity. They are becoming increasingly federated, loosely coupled, distributed and at the same time generating huge numbers of data artifacts, processes, or events (hereinafter "events") ranging from record entries representing business or organizational activities to more technical events at various levels of granularity. Industries such as healthcare and insurance have witnessed an explosion in the growth of semi-structured organizational processes that has been fuelled by the advent of such systems. These organizational or scientific processes depart from the traditional kind of structured processes in that their lifecycle is not fully driven by a formal process model. While an informal description of the process may be available, the execution of a semi-structured process is not completely controlled by a central entity (such as a workflow engine).

Monitoring such semi-structured processes enables a variety of applications such as process discovery, analytics, verification and process improvement. Accomplishing this is an important research challenge.

Correlating events generated by heterogeneous, distributed systems allows for the isolation and tracking of end-to-end instances of a given semi-structured business process computer application. Correlating events has been addressed in the area of integrating large and complex data sources. In this area the task of matching schemas (relational database schemas for instance) for the purposes of tracking an end-to-end process instance has been identified as a very time-consuming and labor intensive process.

Consequently a significant amount of research effort has been devoted to model management such as information retrieval, knowledge representation, schema mapping and translation as well as integration. Extensive work has been conducted in the domain of data integration and exchange, for instance, required for Extract Transform Load (ETL) processes in data warehousing. In data warehousing, an ETL process requires the extraction of data from various sources and the transformation of the data to match a corresponding target schema. In the field of e-commerce, data exchange scenarios require extensive knowledge about the semantics of data structures in order to convert messages from a source schema to a target schema.

Existing work that has been devoted to deriving relationships between data elements has a strong focus on foreign-key relationships and the assumption of relational data (i.e. normalized). The process of finding and defining relationships (correlations) in an arbitrary, potentially redundant and non-normalized data space has thus far received little attention, although it has the potential for tremendous impact.

Processes are frequently executed across different, possibly independent computer systems. On such platforms, particularly event-driven architectures, where no component recognizes another component and the interactions are driven by events in an asynchronous fashion, it is difficult to create a unified view of processes (also known as composite business applications.) Not every event or artifact contains a unified process instance identifier for creating an end-to-end view of processes. In certain scenarios, events are also transformed or aggregated during execution steps so that identifiers that relate events to process instances or to each other become extremely hard to track. This arises when tracking process instances across various system and application layers. In fast changing environments where business application processes are executed across a wide range of distributed computer systems it is difficult to trace process instances as the relationships of events must be explicitly known and defined. Furthermore, supposedly isolated process instances, a transport coordination process for example, can be related to other processes such as the order management and invoicing process. However, in the latter case, the attributes that bridge those distinct processes can only be found in the events of isolated processes instances.

Some existing work addresses how to correlate events to create a historic view to explore and discover different aspects of business processes in the computer applications. Process mining partly addresses this by analyzing logged execution data of process instances and generating a representation of a process model. Current work in the area of process mining and discovery such as require clean pre-processed, chronologically ordered and correlated process instance traces. The correlation specification in such examples is done by a user having an expert knowledge about the domain, the data sources and the involved applications. As such, the existing works do not efficiently address the issues surrounding this area.

SUMMARY OF THE INVENTION

According to one aspect of the present invention, a computer-implemented method is provided for determining a set of correlated data among heterogeneous computer applications. The method includes: (a) providing a computer system, where the system includes software modules embodied on a computer-readable medium, and where the software modules include an input receiver module, a data processing module, and a data transmitting module; (b) receiving statistics on data relating to a first event that is capable of being processed by a first computer application, where the statistics on the first event data is received from a data source, the first event data includes a first attribute, the first attribute includes at least one value, and the receiving statistics on the first event data is performed by the input receiver module; (c) receiving statistics on data relating to a second event that is capable of being processed by a second computer application, where the statistics on the second event data is received from the data source, the second event data includes a second attribute, the second attribute includes at least one value, and the receiving statistics on the second event data is performed by the input receiver module; (d) generating a confidence score for an attribute set based on the received statistics on the first event data and the second event data, where the attribute set includes the first attribute and the second attribute, and the generating the confidence score is performed by the data processing module; and (e) selecting the attribute set as a set of correlated data if the confidence score is within a threshold value, where the selecting is performed by the data processing module.

According to another aspect of the present invention, a computer-implemented system is provided for determining a set of correlated data among heterogeneous computer applications. The system includes: (a) an input receiver module for receiving statistics on data relating to a first event that is capable of being processed on a first computer application and statistics on data relating to a second event that is capable of being processed on a second computer application, where the first event data includes a first attribute, the first attribute includes at least one value, the second event data includes a second attribute, and the second attribute includes at least one value; (b) a data processing module for generating a confidence score for an attribute set based on the received statistics on the first event data and the second event data, where the attribute set includes the first attribute and the second attribute, and for selecting the attribute set as a set of correlated data if the confidence score is within a threshold value; and (c) a data storage module for storing the received statistics on the first event data and the second event data and for storing the generated confidence score.

According to yet another aspect of the present invention, an article of manufacture is provided that includes a computer readable medium having computer readable instructions embodied therein for performing the steps of the computer-implemented method described above.

BRIEF DESCRIPTION OF THE DRAWINGS

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions. The following figures are included:

FIG. 5a shows further details of the example event data illustrated in FIG. 3.

FIG. 5b shows the cardinality values for an attribute of the example event data corresponding to FIG. 5a.

FIG. 5c shows the further statistics determined for each attribute of the example event data corresponding to FIG. 5a.

DETAILED DESCRIPTION OF THE PREFERRED EMBODIMENTS

It will be readily understood that the embodiments of the present invention, as generally described and illustrated in the figures herein, may be arranged and designed in a wide variety of different configurations in addition to the described presently preferred embodiments. Thus, the following detailed description of the embodiments of the present invention, as represented in the figures, is not intended to limit the scope of the invention, as claimed, but is merely representative of selected presently preferred embodiments of the invention. The following description is intended only by way of example, and simply illustrates certain selected presently preferred embodiments of the invention as claimed herein.

A correlation is a set of rules that define which attribute(s) form a relationship between events among heterogeneous computer data sources or applications. In the embodiments of the present invention, identifying a set of correlated event data involves gathering information or statistics on the attributes of various event data and determining attributes that have a correlation by determining a confidence value of each candidate attribute set.

Figure 1:
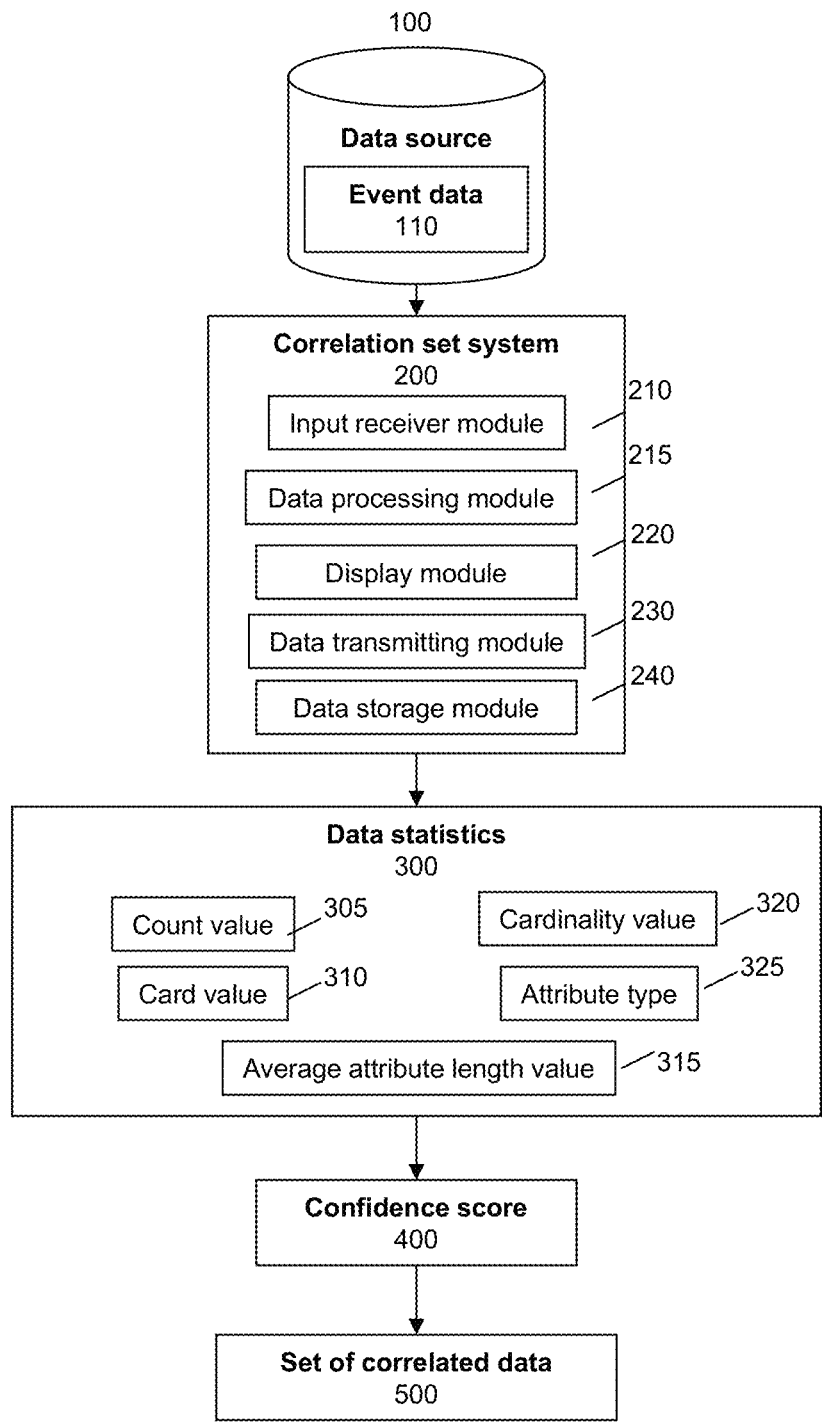
FIG. 1 is a block diagram that illustrates a computer-implemented system for determining a set of correlated data among heterogeneous computer applications according to embodiments of the present invention.

Referring to FIG. 1, a block diagram illustrates a computer-implemented system for determining a set of correlated data among heterogeneous computer applications according to an embodiment of the present invention. The system 200 ("correlation set system") includes an input receiver module 210, a data processing module 215, data storage module 240, an optional display module 220, and an optional data transmitting module 230.

The input receiving module may receive event data 110 as input from a data source 100 that is connected to an external computer application or system or from the data storage module 240 that is connected to the system 200.

The received event data 110 are not assumed to be grouped together in a normalized schema and does not contain any information on meta-data that describes data attributes. An example of event data may be information about a particular action or series or actions taken to execute a certain task within a computer application or system that supports an organizational function. Such an application or system may be an order management, document management, or email application or system. Taking an email application as an example, an event may be sending an email or receiving an email.

Before the event data file is received by the input receiver module 210, the event data 110 may be preprocessed. A configuration setup can be inferred for the data integration and correlation discovery from data that may be present in sample trace files or directly retrieved from other data sources. The configuration setup specifies (a) the properties (or "attributes") extracted from the raw event data and (b) attribute extraction algorithms for extracting the event attributes. After the configuration has been generated, the raw event sources (such as event traces) or a sample set of them are loaded into a data source 100. Details on preprocessing event data is further described in the related U.S. patent application referenced above.

After the raw event data 110 has been pre-processed, the input receiver module 210 receives a file containing the event data 110. The correlation system 200 stores the event data 110 in the data storage module 240 so that it may be accessed by the various modules within the system 200. If the event data has not been pre-processed, then the input file would contain information about the data event type and attribute.

The data processing module 215 generates a confidence score 400 for an attribute set based on the received statistics 300 on a first and second event data. The attribute set includes an attribute of the first received event data ("first attribute") and an attribute of the second received event ("second attribute"). The first event is one that is capable of being processed by a first computer application and the second event is one that is capable of being processed by a second computer application.

All possible attribute sets are evaluated as between the first event and the second event and a confidence score 400 is generated for each set. Note that the statistics may be calculated by the correlation system 200.

The statistics 300 include a count value 305, a card value 310, an average attribute length value 315, a cardinality value 320, and an attribute type 325. More details on statistics calculation will be described below.

After the confidence score 400 is generated, the data processing module 215 determines whether the confidence score 400 is within a threshold value selected by a user. If the confidence score 400 is not within the threshold value, then a conclusion may be made that the attribute does not have correlated data. If the confidence score 400 is within the threshold value, then the attribute set is considered or selected as a set of correlated data 500. More details on generating the confidence score will be described below.

The generated correlation set or correlation rules can be used either during runtime to group related events together, such as events belonging to a process instance or to create a graph of relationships that enables querying and walking the paths of relationships. The optional display module 220 displays a graph that shows a path between the first attribute and the second attribute based on the statistics 300 on the first event data and the second event data.

Consider following correlation:

$$A \cdot x = B \cdot y$$

$$B \cdot y = C \cdot z$$

where A, B, and C are events and x, y, and z are attributes of A, B, and C, respectively. The display module 220 connects A with B, B with C.

The data transmitting module 230 may optionally transmit or send information about the set of correlated data 500 to the first computer application and the second computer application such that the first application is capable of processing the first event using the value of the second attribute and the second application is capable of processing the second event using the value of the first attribute. Because of the established correlation between the attributes, one computer application is able to utilize the information related to the event that is processed by the other computer application.

Figure 2:
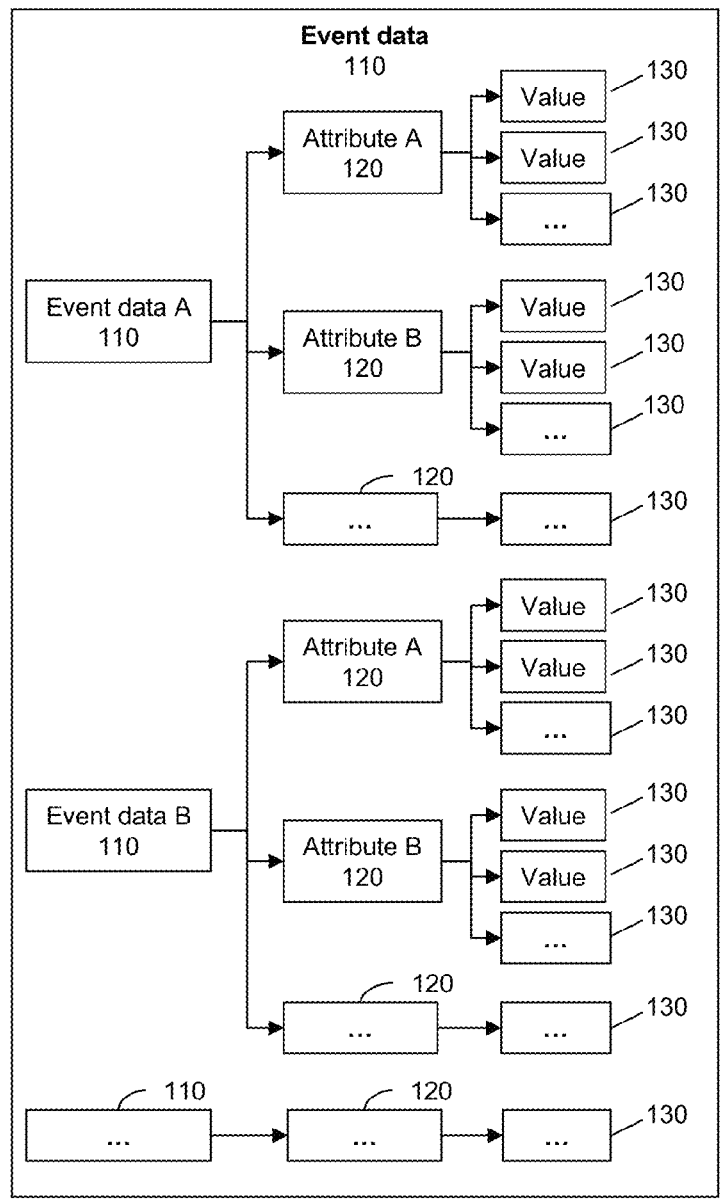
FIG. 2 is a block diagram that illustrates the details of event data according to embodiments of the present invention.

Referring to FIG. 2, a block diagram illustrates the details of event data according to embodiments of the present invention. An event data 110 may contain multiple attributes 120 and each attribute 120 may contain multiple values 130.

Figure 3:
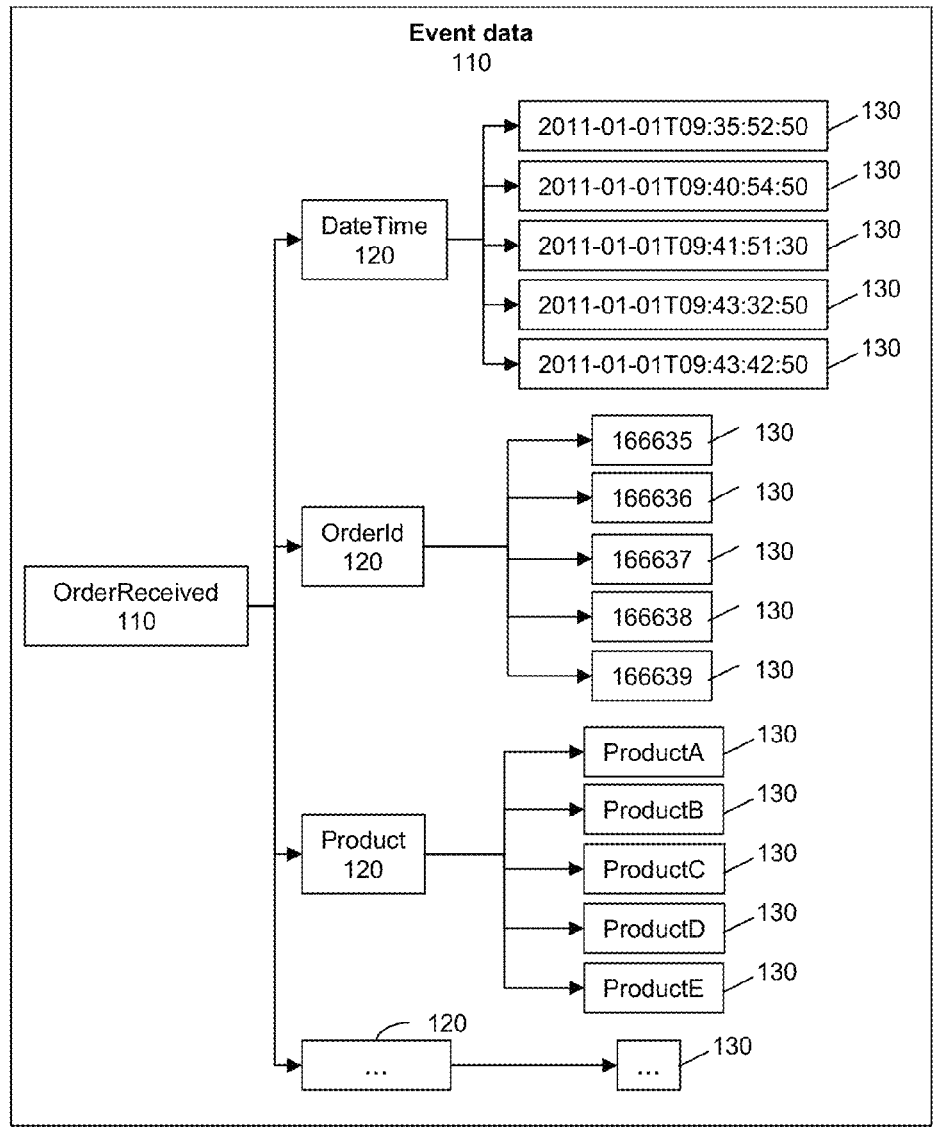
FIG. 3 is a block diagram that illustrates an example of event data according to embodiments of the present invention.

FIG. 3 is a block diagram that illustrates an example of event data according to embodiments of the present invention.

For evaluating the detection performance of the correlation algorithm, a semi-structured case-oriented business process scenario is used as an example relating to export compliance regulations. The general idea is that every order of a foreign customer has to be checked as to whether it violates certain export regulations. In case of a clear export violation or inconsistencies in the customer's business background the order is flagged and a case is created. Before the order is finally declined or released, domain experts must perform some investigation involving e-mail inquiries, site visits and also evidence gathering. This has to be done to ensure that decisions are made objectively and sufficient documentation is available for later justifications or audits (which is important for responsibly releasing an order).

This scenario involves a wide range of heterogeneous systems (Order Management, Document Management, E-Mail, Export Violation Detection Services, . . . ) as well as workflow-supported user-driven interactions (Process Management System). All of those systems generate a wide range of events at different granularity levels which makes it challenging to extract a set of correlation rules that can isolate process instances.

In FIG. 3, the example event data 110 called OrderReceived contains multiple attributes 120: DateTime, OrderID, Product, etc. Each attribute 120 contains multiple values 130.

Figure 4:
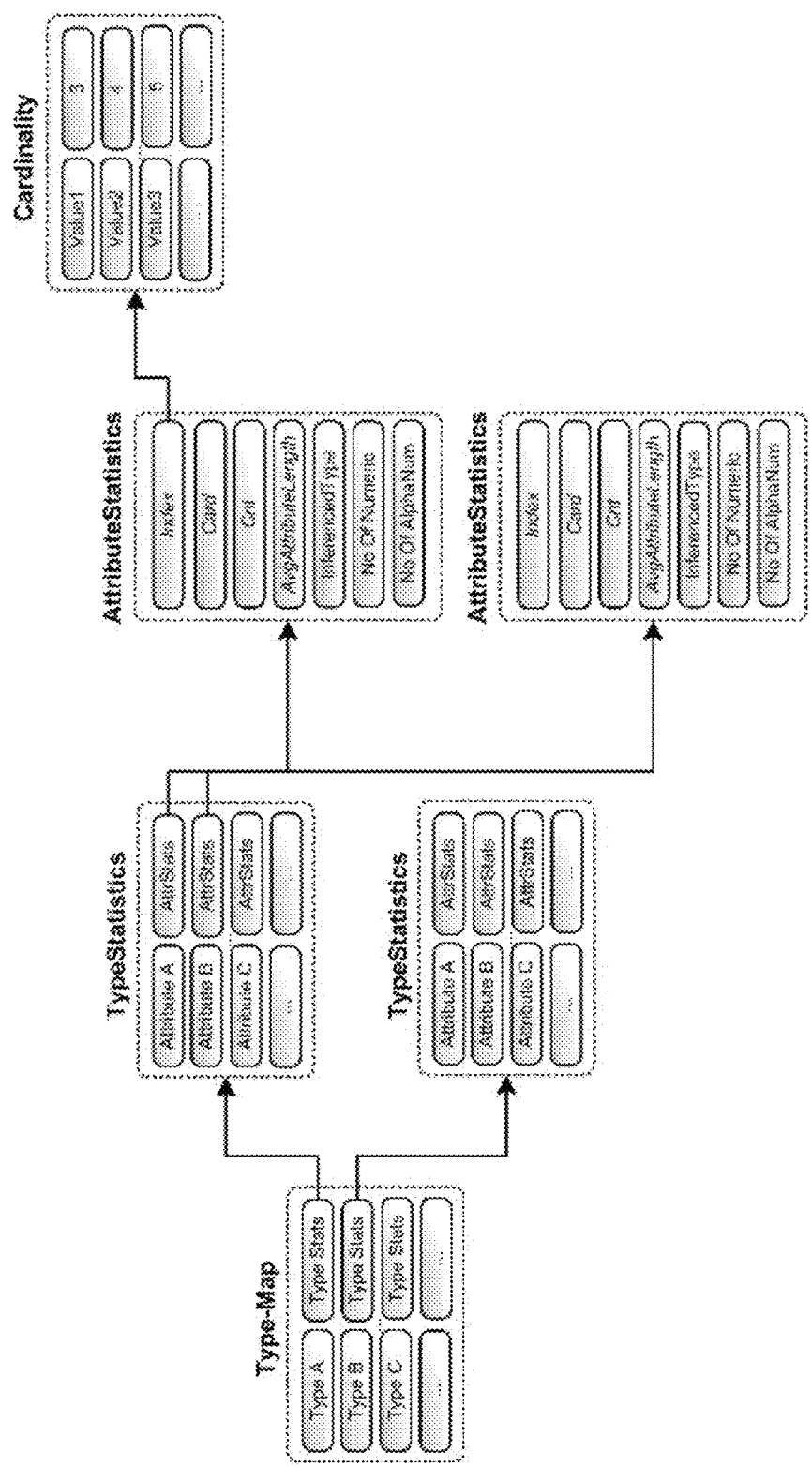
FIG. 4 is a block diagram that illustrates the details of data statistics determined by the data processing module according to embodiments of the present invention.

FIG. 4 is a block diagram that illustrates the details of data statistics, which may be received by the input receiving module from the data source or which may be determined by the data processing module according to embodiments of the present invention. Referring to FIG. 4, for every event, a map or container ("TypeStats") may be created that includes all attributes for that event including statistics for each of those contained attributes.

Each TypeStat contains statistics such as:
(i) Attribute Cardinality ("cardinality value"), which is based on the previously created inverted index, and contains a map of each value and how often each of those values occurred;
(ii) Card ("card value"), which determines the number of different values for the attribute;
(iii) Count ("count value"), which represents the total number of instances in which the attribute occurs (as the data structure does not work on a defined schema it is possible that the attribute does not occur in every instance);
(iv) Average Attribute Length ("average attribute length value"), which represents the average attribute length of the current attribute (This is an indicator about the potential uniqueness of a value. A long value might be the sign that attribute might be a unique identifier. Unique identifiers such as OrderId is a potential attribute that occurs in other types and thus forms a correlation. This may also be misleading since a textual description may be very long and is in fact unique but it is never used for correlating artifacts;
(v) Inferenced or Attribute Type ("inferred attribute type"), which defines the type of an attribute (The type of an attribute is an important characteristic for correlation discovery to reduce the problem space of correlation candidates. The chances that a type would correlate with another attribute given that the type contains mostly alpha-numeric attributes are very low. Currently only a distinction between the numeric and alphanumeric attribute types is made. This particular characteristic can, however, be extended to significantly reduce the problem space. Time-stamps, for instance, could be filtered out of correlation candidates. The determination of the type is made with a fault tolerance of 0.9 (e.g. min. 90% of the values must be numeric), and we refer to this as a parameter Phi);

(vi) NoOfNumeric ("number of numeric types"), which depending on the inferred attribute type, this variable contains the number of values that are of a numeric type;

(vii) NoOfAlphaNum ("number of alpha-numeric types"), which depending on the inferred attribute type, this variable contains the number of values that are of an alpha-numeric type.

Other statistics may be calculated in order as needed to facilitate the creation of a confidence score to find correlation between attributes.

FIG. 5a shows further details of the example event data OrderReceived illustrated in FIG. 3. The OrderReceived event contains the following attributes: DateTime, OrderId, Product, Amount, DeliveryUntil Date and Time ("DeliveryUntil"), and CustomerId. Each of these attributes contain several values.

FIG. 5b shows the cardinality values for the attribute Product of the example event data OrderReceived corresponding to FIG. 5a.

FIG. 5c shows the further statistics 300 determined for each attribute of the example event data OrderReceived corresponding to FIG. 5a.

Figure 6:
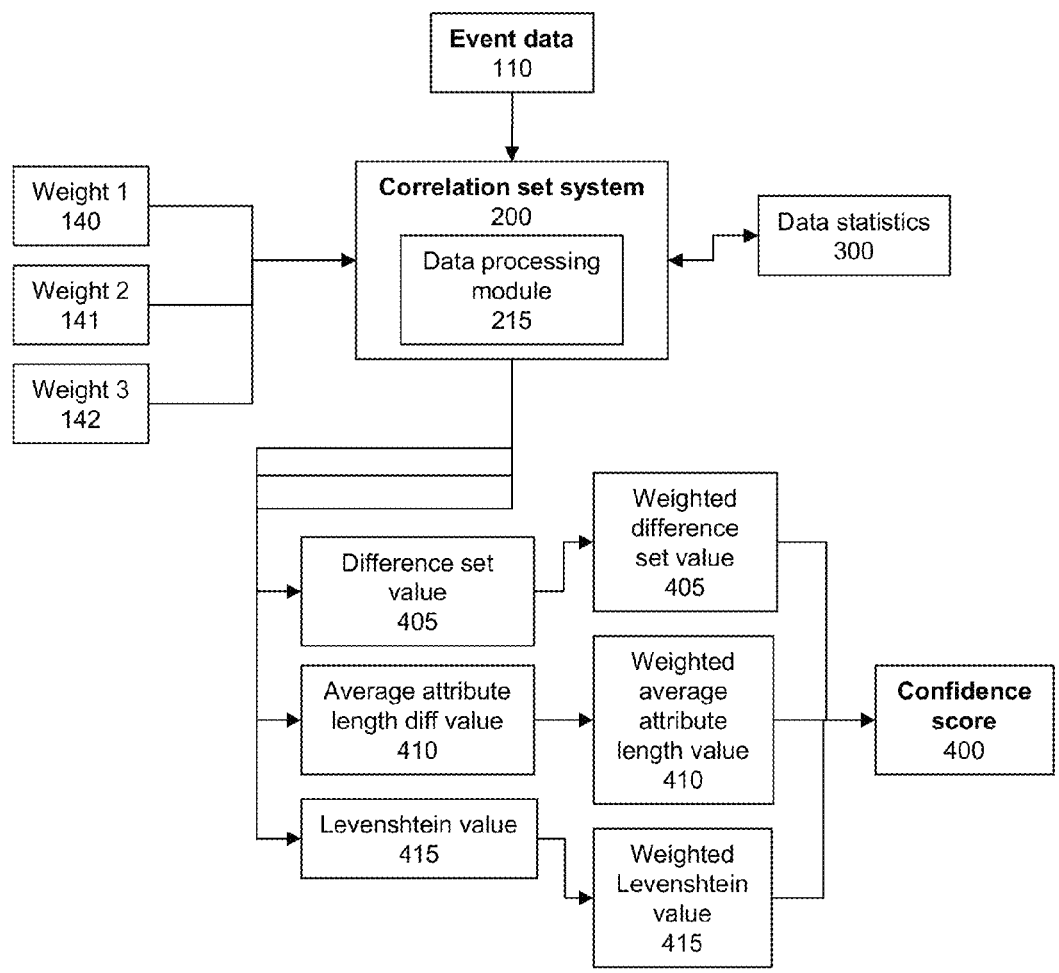
FIG. 6 is a block diagram that illustrates the details of how the data processing module generates a confidence score according to embodiments of the present invention.

FIG. 6 illustrates the details of how the data processing module 215 generates a confidence score 400 according to embodiments of the present invention.

Candidate matching involves analyzing the received or calculated statistics. The data processing module 215 analyzes the statistics 300 to see if these statistics 300 are within certain boundaries (parameters). This is to determine a result set containing pairs of potentially correlating attributes expressed by the confidence score 400. This has the advantage that through a user interface, a user can specify approximate parameters and select the desired candidates. In a fully automated solution, the correlation system 200 can select candidates with a very high confidence factor.

The confidence score 400 of correlation candidates is determined by the following three parameters with a default set of weights.

(a) Difference Set ("difference set value" 405), which is the difference between two correlation candidates and is assigned a first weight 140;

(b) Difference between AvgAttributeLength ("average attribute length difference value" 410), which is difference between the lengths of values of two correlation candidates is assigned a second weight 141; and (c) LevenshteinDistance ("Levenshtein distance value" 415), which is the Levenshtein distance between attribute names is assigned a third weight 142.

The weights 140, 141, 142 for each parameter can be determined experimentally by a user.

The first parameter, difference set value 405, is calculated by creating the difference set of all permutations of pairs of all attribute candidates. However, to reduce the search space of candidates, in one embodiment of the present invention, Highly Indexable Attributes and Mappable Attributes for each event can be determined in forming pair candidates.

A Highly Indexable Attribute is an attribute that is potentially unique for each instance of a type. This attribute is determined by the following formula:

$$Card/Cnt > Alpha \char`\^ AvgAttribtueLength > Epsilon$$

Alpha is a threshold parameter that determines the minimum ratio (i.e. uniqueness) of Card/Cnt and thus allows a small deviation that can be caused for instance by duplicates. Epsilon is an additional parameter that defines the minimum average length of an attribute. The Mappable Attribute can be seen as a mean to reduce the search space of potentially correlating attributes of a type. One approach is to set an upper threshold of how often a value of an attribute can occur. The assumption is that if it occurs more then x times it is unlikely that it is a correlation candidate. This approach of reducing the search space has been inspired from the relational data field. Consider for example an order relation that contains one unique key. Customer complaints are stored into a separate relation containing the order-key as a reference. Now the assumption is that a complaint cannot occur more than 10 times for one order.

The Mappable Attribute is defined as follows:

x . . . Cardinality of a value i . . . Attribute of a type $\{x_i | x < Gamma\}$ Gamma is a threshold parameter that can be set experimentally and customized to the application scenario based on knowledge of the artifacts. This parameter bears a major drawback, however, that in some cases it misses correlation candidates. For example, in a situation where a Customer has many Orders with a foreign-key relationship, it does not make sense to set a limit.

The alpha, epsilon, and gamma values may be adjusted by the user.

By determining all the Indexable and Mappable Attributes of all types the next step is to find candidates of pairs of attributes that potentially correlate with each other. Therefore a difference set $A/B=\{x | x \in A \char`\^ x \notin B\}$ between all permutations of attribute candidates A and B is created. NB must be below a certain threshold in order to be taken into account:

$$|A/B| <= DiffTreshold$$

Candidate Pairs of the permutation mixes are excluded if they have a mismatch of types based on the previously determined InferencedType. The DiffTreshold should be kept in a range between 80-90% for most cases depending on the domain. A difference, |A/B|, can occur for instance if there are a lot of process instances that are not finished (i.e. do not contain all expected correlations) at the point when the algorithm is applied. This may also be true when using a subset of artifacts as a sample set to discover correlations. Depending on the domain and the artifact sources, sampling can become a hard problem. For instance, if correlation discovery is applied on a subset representing one week's data it would be successful in identifying lower-level events that occur frequently in short timeframes. This means that instances have a good likelihood of being discovered. On the other hand for long-lasting processes that span several weeks or months certain artifacts might not be well represented in such a data sample. Therefore it is important to configure the DiffTreshold parameter based on knowledge of the scenario.

The second weighting factor for the confidence is the difference between the AvgAttributeLength 410 of the two correlation candidates. If the difference of the attribute lengths 410 has a strong variance it might mean that they won't share significant relationships.

The last variable that influences confidence weighting is the Levenshtein distance 415 between the names of two attributes. It is common that attribute names from different sources might have the same or comparable names if they have the same meaning. For example, in one system the attribute that contains the identifier for an order is named OrderId and in the other it is named order-id.

In one experiment, 24 event types were evaluated, which altogether contained 95 attributes into account for correlation discovery. The main configurable parameters for the algorithm are set as follows: Alpha=0.8, Gamma=1000, Epsilon=5, Phi=0.9 and DiffTreshold=80. The experimental correlation set system detected a total of 479 correlation sets.

The large number of correlation pairs can also be reduced to a handful of sets by taking transitivity or associativity into account. This might not be always desirable, especially if the sets produce a correlation graph having a connection between every related event.

Figure 7:
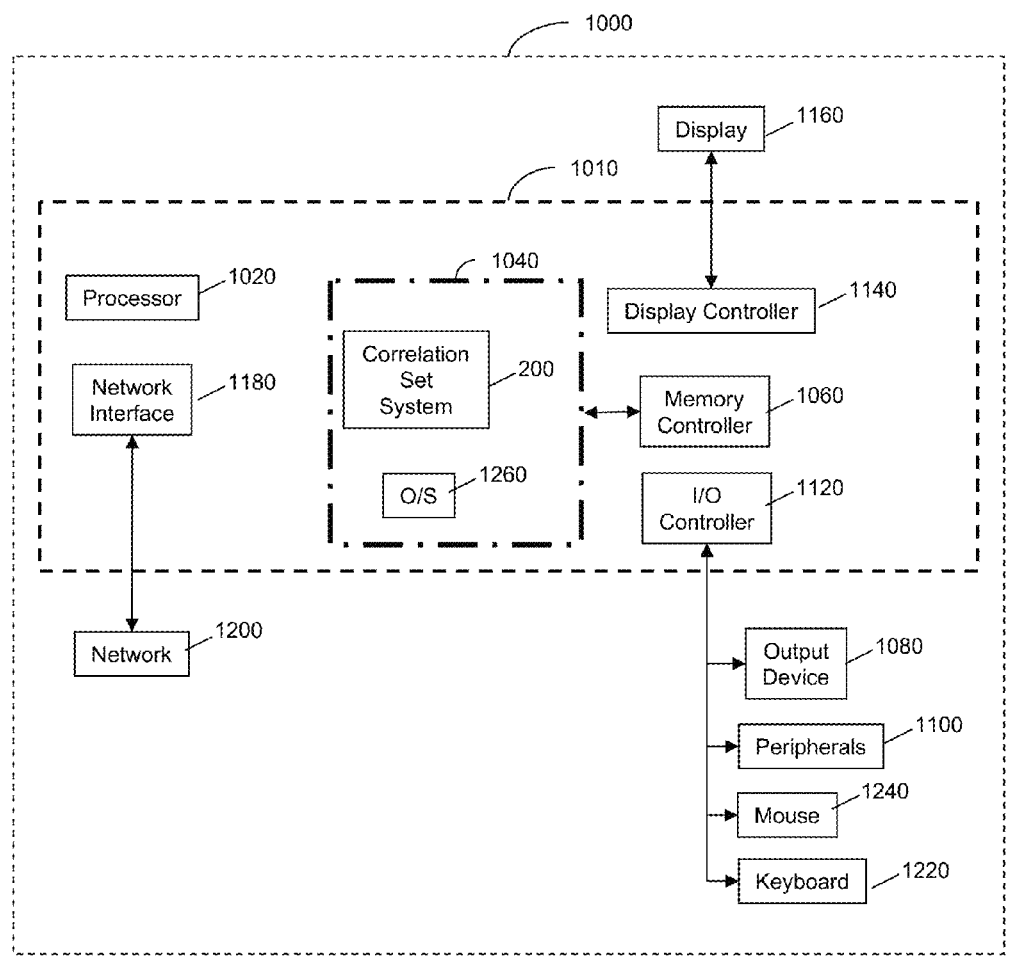
FIG. 7 is a block diagram that illustrates a computer-implemented system that includes the system for determining a set of correlated data among heterogeneous computer applications according to embodiments of the present invention.

FIG. 7 is a block diagram that illustrates a computer-implemented system that includes the system 200 for determining a set of correlated data among heterogeneous computer applications according to embodiments of the present invention.

As can be appreciated, the computing system 1000 may include a computing device, including but not limited to, a desktop computer, a laptop, a server, a portable handheld device, or any other electronic device. For ease of the discussion, an embodiment of the invention will be discussed in the context of the computer 1010.

The computer 1010 is shown to include a processor 1020, memory 1040 coupled to a memory controller 1060, one or more input and/or output (I/O) devices, peripherals 1080, 1100 that are communicatively coupled via a local input/output controller 1120, and a display controller 1180 coupled to a display 1160. In an exemplary embodiment, the system 1000 can further include a network interface 1140 for coupling to a network 1200. The network 1200 transmits and receives data between the computer 1010 and external systems. In an exemplary embodiment, a conventional keyboard 1220 and mouse 1240 can be coupled to the input/output controller 1200.

In various embodiments, the memory 1040 stores instructions that can be executed by the processor 1020. The instructions stored in memory 1040 may include one or more separate programs, each of which comprises an ordered listing of executable instructions for implementing logical functions. In the example of FIG. 7, the instructions stored in the memory 1040 include at least a suitable operating system (OS) 1260 and correlation set system 200. The operating system 1260 essentially controls the execution of other computer programs and provides scheduling, input-output control, file and data management, memory management, and communication control and related services.

When the computer 1010 is in operation, the processor 1020 is configured to execute the instructions stored within the memory 1040, to communicate data to and from the memory 1040, and to generally control operations of the computer 1010 pursuant to the instructions. The processor 1020 can be any custom made or commercially available processor, a central processing unit (CPU), an auxiliary processor among several processors associated with the computer 1010, a semiconductor based microprocessor (in the form of a microchip or chip set), a macroprocessor, or generally any device for executing instructions.

The processor 1020 executes the instructions of the correlation set system 200 according to embodiments of the present invention. In various embodiments, the correlation set system 200 of the present invention is stored in the memory 1040 (as shown), is executed from a portable storage device (e.g., CD-ROM, Diskette, FlashDrive, etc.) (not shown), and/or is run from a remote location such as from a central server (not shown). The correlation set system 200 may be a software application that carries out a process such as described below with reference to FIG. 9. In some embodiments of the present invention, memory 1040 also stores data, such as received event data 110 or statistics 300 that are shown in FIG. 1.

Figure 8:
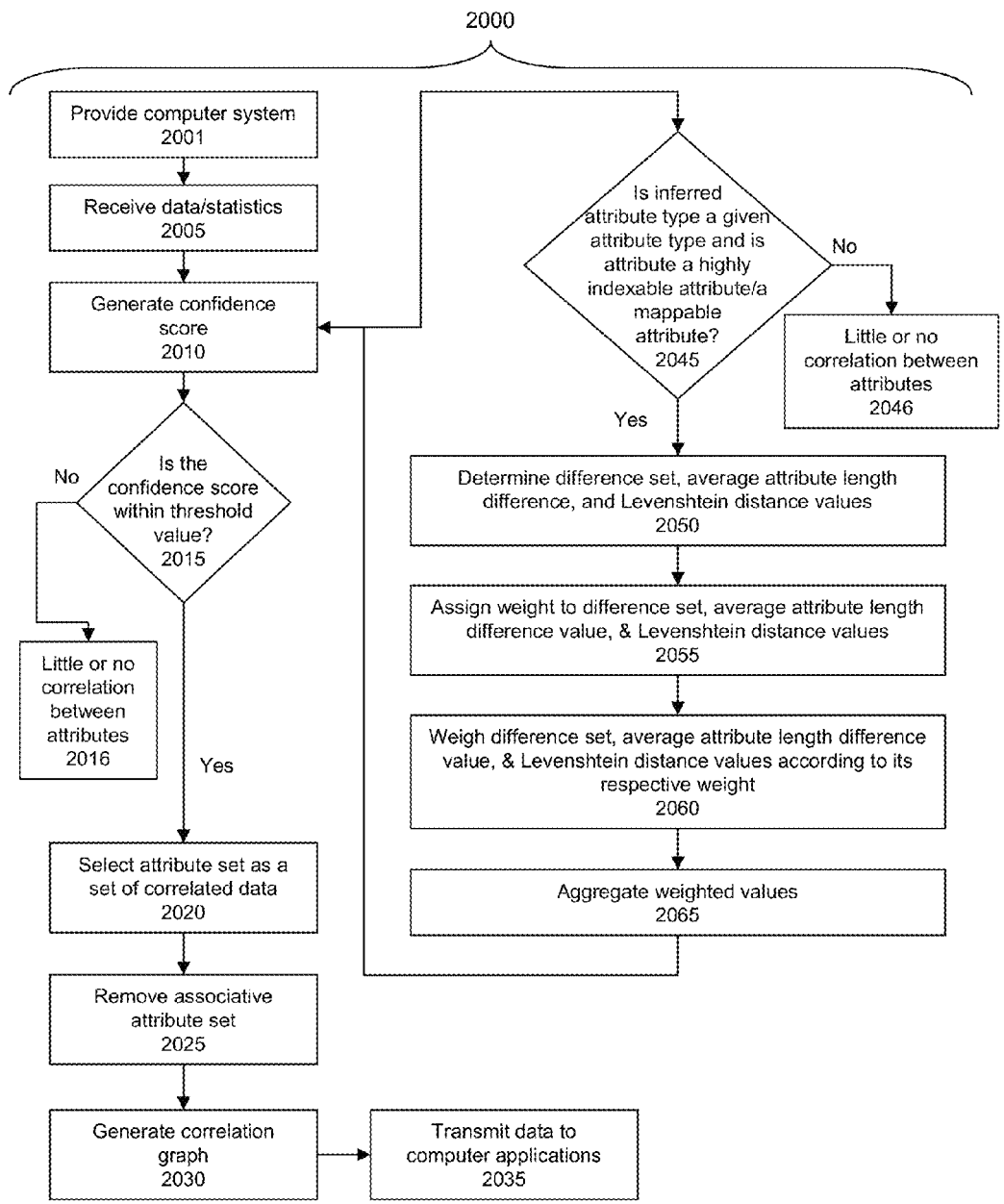
FIG. 8 is a flow chart that illustrates a computer-implemented method of determining a set of correlated data among heterogeneous computer applications according to embodiments of the present invention.

According to another embodiment of the present invention, a computer-implemented is provided for determining a set of correlated data among heterogeneous computer applications. Referring to FIG. 8, the method 2000 begins at step 2001 where it provides a computer system that includes various software modules that are embodied on a computer-readable medium. The software modules include an input receiver module, a data processing module, a data transmitting module, a data storage module, and an optional display module.

At step 2005, the input receiver module receives statistics on data that relates to a first event and data that relates to a second event. The first event is one that can be processed by a first computer application and the second event is one that can be processed by another or a second computer application. These statistics related to the event data may be received from a data source as described in the above embodiments. If the data source does not contain statistics related to the event data, then the data processing module may calculate statistics on the first and second event data based on received attribute and data-type information about the events. The statistics on the event data are similar to those which have been described for the embodiments discussed above, e.g., count value, card value, average attribute length value, cardinality value, inferred attribute type, number of numeric types, number of alpha-numeric types, etc.

At step 2010, the data processing module generates a confidence score for an attribute set based on the received statistics on the first and second event data. The attribute set includes an attribute of the first received event data ("first attribute") and an attribute of the second received event ("second attribute"). All possible attribute sets are evaluated as between the first event and the second event and a confidence score is generated for each set.

When the statistical information is received or calculated, the data processing module makes determinations that include (1) whether an attribute is a certain attribute type, e.g., alpha-numeric or numeric, (2) whether the first attribute is a highly indexable attribute, and (3) whether the second attribute is a mappable attribute (step 2045). If the attribute is not a particular attribute type sought after, and if the first attribute is not a highly indexable attribute, or the second attribute is not a mappable attribute, then a conclusion may be made that there is little or no correlation between the attributes of the attribute set (see step 2046). If the attribute satisfies all of these qualities, then the data processing module continues to determine a difference set value, an average attribute length difference value, and a Levenshtein distance value at step 2050. A weight is assigned and applied to these values (steps 2055 and 2060). The data processing module then aggregate these weighted values to create the confidence score (step 2065.) The weight assigned to the difference set value, average attribute length difference value, and Levenshtein distance value may be determined by the user.

After the confidence score is generated, the data processing module determines whether the confidence score is within a threshold value selected by a user (see step 2015.) If the confidence score is not within the threshold value, then a conclusion may be made that there is little or no correlation between the attributes of the attribute set (see step 2016.) If the confidence score is within the threshold value, then the attribute set is considered or selected as a set of correlated data (see step 2020.) To account for transitivity, associated attribute sets are removed from consideration or removed the set of an existing correlated data (see step 2025.)

At step 2030, an optional display module can generate a correlation graph between the correlated attribute set. As discussed above, if we have the following correlation:

$$A \cdot x = B \cdot y$$

$$B \cdot y = C \cdot z$$

where A, B, and C are events and x, y, and z are attributes of A, B, and C, respectively. The display module connects A with B, B with C.

At step 2035, the data transmitting module may optionally transmit or send information about the set of correlated data to the first computer application and the second computer application such that the first application is capable of processing the first event using the value of the second attribute and the second application is capable of processing the second event using the value of the first attribute. Because of the established correlation between the attributes, one computer application is able to utilize the information related to the event that is processed by the other computer application.

Figure 9:
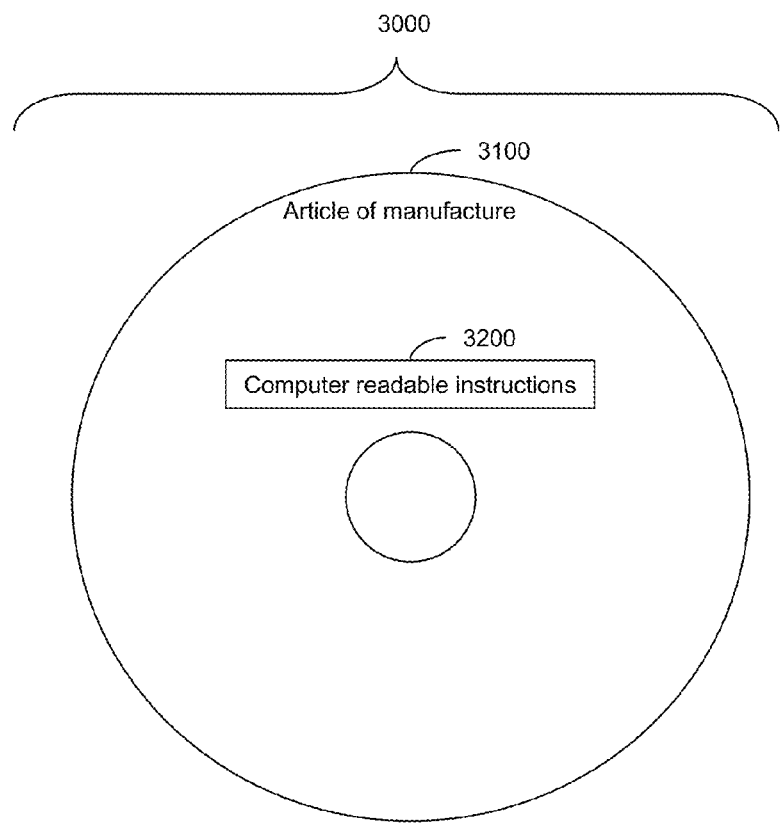
FIG. 9 is an illustration of an article of manufacture for carrying out the steps of the methods according to embodiments of the present invention.

According to a further embodiment of the present invention, an article of manufacture is provided that includes a computer readable medium having computer readable instructions embodied therein for performing the steps of the computer-implemented method described above. FIG. 9 illustrates the article of manufacture 3100 that includes a computer readable medium having computer readable instructions 3200 for carrying out the steps of the method 2000 discussed above with reference to FIG. 8.

A combination of one or more computer readable medium (s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer-implemented method of determining a set of correlated data among heterogeneous computer applications, said method comprising:

providing a computer system, wherein said system comprises software modules embodied on a computer-readable medium, wherein said software modules comprise an input receiver module, a data processing module, a data transmitting module, and a data storage module;

receiving statistics on data relating to a first event that is processed by a first computer application and storing said statistics in said data storage module, wherein said statistics on said first event data is received from a data source, said first event data includes a first attribute, said

13 first attribute includes at least one value, and said receiving statistics on said first event data is performed by said input receiver module;

receiving statistics on data relating to a second event that is processed by a second computer application and storing said statistics in said data storage module, wherein said statistics on said second event data is received from said data source, said second event data includes a second attribute, said second attribute includes at least one value, and said receiving statistics on said second event data is performed by said input receiver module;

generating a confidence score for an attribute set based on said received statistics on said first event data and said second event data, wherein said attribute set includes said first attribute and said second attribute, and said generating said confidence score is performed by said data processing module, which comprises the steps of:

determining a difference set value, an average attribute length difference value, and a Levenshtein distance value for said attribute set;

assigning a first weight to said difference set value for said attribute set and weighing said difference set value according to said first weight;

assigning a second weight to said average attribute length difference value for said attribute set and weighing said average attribute length difference value according to said second weight;

assigning a third weight to said Levenshtein distance value for said attribute set and weighing said Levenshtein distance value according to said third weight; and aggregating said weighted difference set value for said attribute set, said weighted average attribute length difference value for said attribute set, and said weighted Levenshtein distance value for said attribute set to generate said confidence score for said attribute set; and selecting said attribute set as a set of correlated data if said confidence score is within a threshold value, wherein said selecting is performed by said data processing module.

2. The method according to claim 1, wherein:

said statistics on said first event data is selected from the group consisting of:
  (i) a count value, wherein said count value is the total number of instances in which said first attribute appears within said first event data;
  (ii) a card value, wherein said card value is the total number of unique values for said first attribute;
  (iii) an average attribute length value, wherein said average attribute length value is the average length of all values of said first attribute;
  (iv) a cardinality value, wherein said cardinality value is the frequency of occurrence of said at least one value of said first attribute and wherein said occurrences is within said first attribute; and
  (v) an attribute type for said first attribute; and said statistics on said second event data is selected from the group consisting of:
  (i) a count value, wherein said count value is the total number of instances in which said second attribute appears within said second event data;
  (ii) a card value, wherein said card value is the total number of unique values for said second attribute;
  (iii) an average attribute length value, wherein said average attribute length value is the average length of all values of said second attribute;

14

(iv) a cardinality value, wherein said cardinality value is the frequency of occurrence of said at least one value of said second attribute and wherein said occurrence is within said second attribute; and
  (v) an attribute type for said second attribute.

3. The method according to claim 1, wherein said step of generating a confidence score for an attribute set based on said received statistics on said first event data and said received statistics on said second event data comprises:

determining if said first attribute is a Highly Indexable Attribute;

determining if said second attribute is a mappable attribute;

if said first attribute is a Highly Indexable Attribute and said second attribute is a mappable attribute, determining a difference set value, an average attribute length difference value, and a Levenshtein distance value for said attribute set;
  (i) assigning a first weight to said difference set value for said attribute set and weighing said difference set value according to said first weight;
  (ii) assigning a second weight to said average attribute length difference value for said attribute set and weighing said average attribute length difference value according to said second weight;
  (iii) assigning a third weight to said Levenshtein distance value for said attribute set and weighing said Levenshtein distance value according to said third weight; and
  (iv) aggregating said weighted difference set value for said attribute set, said weighted average attribute length difference value for said attribute set, and said weighted Levenshtein distance value for said attribute set to generate said confidence score for said attribute set.

4. The method according to claim 3, wherein:

determining if said first attribute is a Highly Indexable Attribute comprises analyzing said statistics on said first event to determine if (i) the ratio between a card value for said first attribute and a count value for said first attribute is greater than an alpha value and if (ii) an average attribute length value for said first attribute is greater than an epsilon value.

5. The method according to claim 1, wherein said step of generating a confidence score for an attribute set based on said received statistics on said first event data and said received statistics on said second event data comprises:

determining if an attribute type for said first attribute is a certain attribute type;

determining if an attribute type for said second attribute is said certain attribute type;

determining if said first attribute is a Highly Indexable Attribute;

determining if said second attribute is a mappable attribute;

if said attribute type for said first attribute is said certain attribute type and an inferred attribute type for said second attribute is said certain attribute type and if said first attribute is a Highly Indexable Attribute and said second attribute is a mappable attribute,
  (i) determining a difference set value, an average attribute length difference value, and a Levenshtein distance value for said attribute set;
  (ii) assigning a first weight to said difference set value for said attribute set and weighing said difference set value according to said first weight;
  (iii) assigning a second weight to said average attribute length difference value for said attribute set and weighing said average attribute length difference value according to said second weight;

(iv) assigning a third weight to said Levenshtein distance value for said attribute set and weighing said Levenshtein distance value according to said third weight; and (v) aggregating said weighted difference set value for said attribute set, said weighted average attribute length difference value for said attribute set, and said weighted Levenshtein distance value for said attribute set to generate said confidence score for said attribute set.

6. A computer-implemented method of determining a set of correlated data among heterogeneous computer applications, said method comprising:

providing a computer system, wherein said system comprises software modules embodied on a computer-readable medium, wherein said software modules comprise an input receiver module, a data processing module, a data transmitting module, and a data storage module;

receiving statistics on data relating to a first event that is processed by a first computer application and storing said statistics in said data storage module, wherein said statistics on said first event data is received from a data source, said first event data includes a first attribute, said first attribute includes at least one value, and said receiving statistics on said first event data is performed by said input receiver module;

receiving statistics on data relating to a second event that is processed by a second computer application and storing said statistics in said data storage module, wherein said statistics on said second event data is received from said data source, said second event data includes a second attribute, said second attribute includes at least one value, and said receiving statistics on said second event data is performed by said input receiver module;

generating a confidence score for an attribute set based on said received statistics on said first event data and said second event data, wherein said attribute set includes said first attribute and said second attribute, and said generating said confidence score is performed by said data processing module;

selecting said attribute set as a set of correlated data if said confidence score is within a threshold value, wherein said selecting is performed by said data processing module; and removing said selected attribute set from said set of correlated data if said set of correlated data contains another attribute set having a first attribute that is the same as said first attribute and having a second attribute that is the same as said second attribute, wherein said removing is performed by said data processing module.

7. The method according to claim 6, wherein said system further comprises a display module, said method further comprises generating a graph that shows a path between said first attribute and said second attribute based on said statistics on said first event data and said statistics on said second event data, said generating said graph is performed if said confidence score is within a threshold value, and said generating said graph is performed by said display module.

8. The method according to claim 7, further comprising:

if said attribute set is selected as a set of correlated data, transmitting information about said set of correlated data to said first computer application and said second computer application such that said first computer application is processing said first event using said at least one value of said second attribute and said second computer application is processing said second event using said at least one value of said first attribute, wherein said transmitting is performed by said data transmitting module.

9. A computer-implemented system for determining a set of correlated data among heterogeneous computer applications, said system comprising:

a computer system comprising software modules embodied on a computer-readable medium, wherein said software modules comprise:

an input receiver processor configured to receive statistics on data relating to a first event that is processed on a first computer application and statistics on data relating to a second event that is processed on a second computer application, wherein said first event data includes a first attribute, said first attribute includes at least one value, said second event data includes a second attribute, and said second attribute includes at least one value;

a data processing processor configured to generate a confidence score for an attribute set based on said received statistics on said first event data and said second event data, wherein said attribute set includes said first attribute and said second attribute, and for selecting said attribute set as a set of correlated data if said confidence score is within a threshold value, wherein said data processing processor is configured to generate said confidence score by:

determining a difference set value, an average attribute length difference value, and a Levenshtein distance value for said attribute set;

assigning a first weight to said difference set value for said attribute set and weighing said difference set value according to said first weight;

assigning a second weight to said average attribute length difference value for said attribute set and weighing said average attribute length difference value according to said second weight;

assigning a third weight to said Levenshtein distance value for said attribute set and weighing said Levenshtein distance value according to said third weight; and aggregating said weighted difference set value for said attribute set, said weighted average attribute length difference value for said attribute set, and said weighted Levenshtein distance value for said attribute set to generate said confidence score for said attribute set; and a data storage processor configured to store said received statistics on said first event data and said second event data and for storing said generated confidence score.

10. The system according to claim 9, wherein:

said statistics on said first event data is selected from the group consisting of:

(i) a count value, wherein said count value is the total number of instances in which said first attribute appears within said first event data;

(ii) a card value, wherein said card value is the total number of unique values for said first attribute;

(iii) an average attribute length value, wherein said average attribute length value is the average length of all values of said first attribute;

(iv) a cardinality value, wherein said cardinality value is the frequency of occurrence of said at least one value of said first attribute and wherein said occurrences is within said first attribute; and (v) an attribute type for said first attribute;

said statistics on said second event data is selected from the group consisting of:
  (i) a count value, wherein said count value is the total number of instances in which said second attribute appears within said second event data;
  (ii) a card value, wherein said card value is the total number of unique values for said second attribute;
  (iii) an average attribute length value, wherein said average attribute length value is the average length of all values of said second attribute;
  (iv) a cardinality value, wherein said cardinality value is the frequency of occurrence of said at least one value of said second attribute and wherein said occurrence is within said second attribute; and
  (v) an attribute type for said second attribute.

11. The system according to claim 9, wherein
said input receiver module is configured to receive said statistics on said first event data and said statistics on said second event data from a data source.

12. The system according to claim 9, wherein:
said data processing module is further configured to calculate said statistics on said first event and said statistics on said second event;
said data storage module is further configured to store said calculated statistics on said first event and said second event; and
said input receiver module is further configured to receive said calculated statistics on said first event data and said second event data from said data storage module.

13. The system according to claim 9, wherein said data processing module is configured to generate said confidence score by:
determining if said first attribute is a Highly Indexable Attribute;
determining if said second attribute is a mappable attribute;
if said first attribute is a Highly Indexable Attribute and said second attribute is a mappable attribute,
  (i) determining a difference set value, an average attribute length difference value, and a Levenshtein distance value for said attribute set;
  (ii) assigning a first weight to said difference set value for said attribute set and weighing said difference set value according to said first weight;
  (iii) assigning a second weight to said average attribute length difference value for said attribute set and weighing said average attribute length difference value according to said second weight;
  (iv) assigning a third weight to said Levenshtein distance value for said attribute set and weighing said Levenshtein distance value according to said third weight; and
  (v) aggregating said weighted difference set value for said attribute set, said weighted average attribute length difference value for said attribute set, and said weighted Levenshtein distance value for said attribute set to generate said confidence score for said attribute set.

14. The system according to claim 9, wherein said data processing module is configured to generate said confidence score by:
determining if an attribute type for said first attribute is a certain attribute type;
determining if an attribute type for said second attribute is said certain attribute type;
determining if said first attribute is a Highly Indexable Attribute;
determining if said second attribute is a mappable attribute;
if said attribute type for said first attribute is said certain attribute type and an inferred attribute type for said second attribute is said certain attribute type and if said first attribute is a Highly Indexable Attribute and said second attribute is a mappable attribute,
  (i) determining a difference set value, an average attribute length difference value, and a Levenshtein distance value for said attribute set;
  (ii) assigning a first weight to said difference set value for said attribute set and weighing said difference set value according to said first weight;
  (iii) assigning a second weight to said average attribute length difference value for said attribute set and weighing said average attribute length difference value according to said second weight;
  (iv) assigning a third weight to said Levenshtein distance value for said attribute set and weighing said Levenshtein distance value according to said third weight; and
  (v) aggregating said weighted difference set value for said attribute set, said weighted average attribute length difference value for said attribute set, and said weighted Levenshtein distance value for said attribute set to generate said confidence score for said attribute set.

15. A computer-implemented system for determining a set of correlated data among heterogeneous computer applications, said system comprising:
a computer system comprising software modules embodied on a computer-readable medium, wherein said software modules comprise:
an input receiver module configured to receive statistics on data relating to a first event that is processed on a first computer application and statistics on data relating to a second event that is processed on a second computer application, wherein said first event data includes a first attribute, said first attribute includes at least one value, said second event data includes a second attribute, and said second attribute includes at least one value;
a data processing module configured to generate a confidence score for an attribute set based on said received statistics on said first event data and said second event data, wherein said attribute set includes said first attribute and said second attribute, and for selecting said attribute set as a set of correlated data if said confidence score is within a threshold value;
a data storage module configured to store said received statistics on said first event data and said second event data and for storing said generated confidence score, and
said data processing module is further configured remove said selected attribute set from said set of correlated data if said set of correlated data contains another attribute set having a first attribute that is the same as said first attribute and having a second attribute that is the same as said second attribute.

16. The system according to claim 15, further comprising:
a display controller module configured to display a graph that shows a path between said first attribute and said second attribute based on said statistics on said first event data and said second event data.

17. The system according to claim 16, further comprising:
a. a data transmitting module configured to transmit information about said set of correlated data to said first computer application and said second computer application such that said first computer application is processing said first event using said at least one value of said second attribute and said second computer application is processing said second event using said at least one value of said first attribute, wherein said transmitting is performed if said attribute set is selected as a set of correlated data.

18. An article of manufacture comprising a non-transitory computer readable storage medium having computer readable instructions embodied therein that, when executed by a computer, implements a method of determining a set of correlated data among heterogeneous computer applications, said method comprising the steps of claim 1.

19. An article of manufacture comprising a non-transitory computer readable storage medium having computer readable instructions embodied therein that, when executed by a computer, implements a method of determining a set of correlated data among heterogeneous computer applications, said method comprising the steps of claim 6.

* * * * *